G. B. RICHART.
VALVE.
APPLICATION FILED OCT. 26, 1911.
1,039,804.
Patented Oct. 1, 1912.
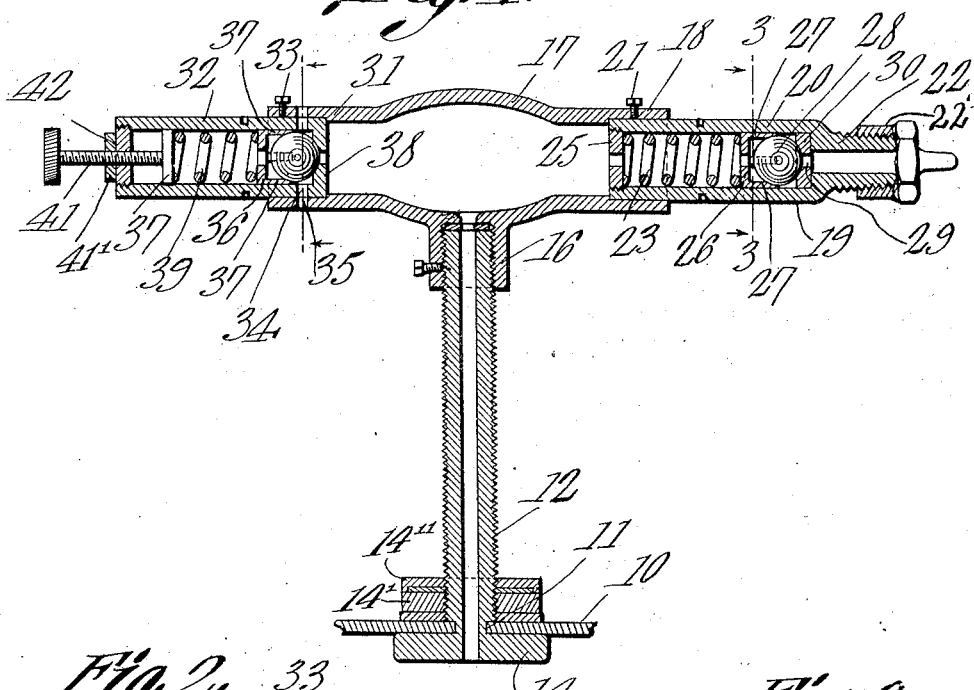
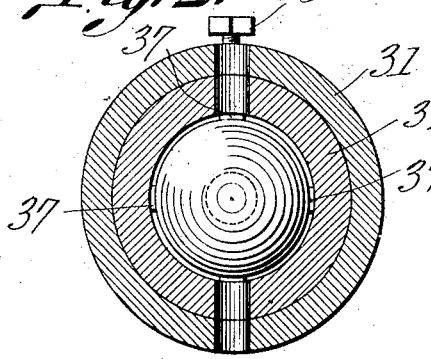
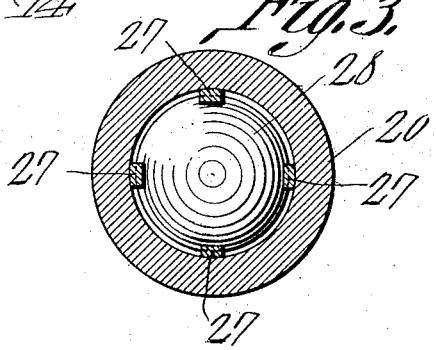
Witnesses
George B. Richart,
Inventor
by C. A. Snow & Co.
Attorneys

UNITED STATES PATENT OFFICE.

GEORGE B. RICHART, OF INDIANAPOLIS, INDIANA.

VALVE.

1,039,804.

Specification of Letters Patent.     Patented Oct. 1, 1912.

Application filed October 26, 1911. Serial No. 656,896.

*To all whom it may concern:*

Be it known that I, GEORGE B. RICHART, a citizen of the United States, residing at Indianapolis, in the county of Marion and State of Indiana, have invented a new and useful Valve, of which the following is a specification.

This invention relates to an improvement in valves for pneumatic tires.

The primary object of the present invention is to provide a valve mechanism for pneumatic tires or in fact any air tank or cushion which will prevent the pressure from rising above a certain predetermined quantity, and when used in connection with vehicle tires the same is adapted to permit the escape of air when the tire contacts with an obstruction.

In the drawings:—Figure 1 is a longitudinal sectional view of the valve. Fig. 2 is a section on the line 2—2 of Fig. 1. Fig. 3 is a section on the line 3—3 of Fig. 1.

In the drawings 10 designates the cushion which is provided with an aperture through which the reduced stem 11 of the screw-threaded tube 12 extends, this tube being substantially semi-circular in cross section, the nut or enlargement 14 being positioned within the cushion, this nut or enlargement being formed integral with or secured to the reduced portion of the tube which extends within the portion 16 of the substantially T-shaped coupling 17. The tube is securely clamped to the cushion by lock nuts 14′ and 14″. The end portion 18 of the coupling is adapted to receive the inflating valve 19 which consists of the cylinder 20 which extends within the portion 18, being held against displacement by a set screw 21. This cylinder is provided with the reduced extension 22 to which the inflating device may be secured, a dust cap 22′ forming a closure for said extension, a coiled spring 23 being arranged within the cylinder, one end of said coiled spring bearing against the apertured nut 25 arranged adjacent one end of the cylinder, and the other against an apertured plate 26 from which the arms 27 extend, the arms 27 contacting with a ball 28 which incloses the aperture 29 in the plate 30, the spring being of sufficient strength to normally hold the ball 28 in contact with the plate 30, the plate being concaved to form a seat for the ball. As the air is forced through the reduced portion 27 of the cylinder the ball will be forced against the tension of the spring, air being admitted to the coupling 17, passing through the tube 12 to the cushion. Arranged in the portion 31 of the coupling 17, which is similar to the portion 18 is a cylinder 32 which is held within the portion 31 by means of a set screw 33, the cylinder being formed with apertures 34 in register with apertures 35 formed in the coupling. The end portion 38 of the cylinder 32 is apertured, said end portion being concaved interiorly to form a seat for a ball similar to the ball 28, said ball being centered to close the opening formed in the end portion 38 by the arms 37 of the apertured plate 36 which is similarly constructed to the plate 26. A coiled spring 39 bears against the plate 36, the other end of the said spring contacting with the head 37 of the screw-threaded plunger 41, said plunger passing through the screw-threaded nut 42 which incloses the outer end of the cylinder, the screw being advanced or retarded in order to increase the pressure on the plate 37.

Air is forced into the cushion the same passing through the cylinder 41 and the coupling and passes through the portion 22 of the cylinder 20 overcoming the tendency of the spring which seats the ball 28, the air then passing through the coupling 17 and to the tire or cushion. It will be noted that by regulating the plunger 41 which is held in fixed position by a nut 41′, the valve contained in the cylinder 33 will be opened when a certain quantity of air has been forced within the cushion, thus by a proper regulation of the piston or plunger 41 it would be impossible to over-inflate the tire or cushion. It will also be noted that when the same is used in connection with tires that should the tire contact with an obstruction, a portion of the air will be forced through the tube 12 and will escape through the opening 34, the alined openings 33 and 34 permitting the escape of air when the ball is forced against the tension of the spring 33.

The many advantages of a device of this character will be clearly apparent as it is noted that the same affords simple and efficient means for preventing "blow-outs" of tires, the structure being such as may be easily and economically manufactured, the various parts being readily assembled.

What is claimed is:—

A valve for air cushions consisting of a casing, a connection between said casing and said cushion, said casing being formed with extensions, a tube removably positioned within each of said extensions, an escape valve positioned within one of said tubes, an apertured plate arranged at each end of said tubes, an apertured plate movable within one of said tubes, said plate being formed with a plurality of fingers, a ball embraced by said fingers, said ball forming a closure for the apertures in one end of the tube and a coiled spring interposed between the movable plate and the apertured end wall of the tube remote from that with which the ball contacts.

In testimony that I claim the foregoing as my own, I have hereto affixed my signature in the presence of two witnesses.

GEORGE B. RICHART.

Witnesses:
W. R. HUNTER,
WM. T. MEAD.